J. C. BLEDSOE.
POULTRY COOP.
APPLICATION FILED NOV. 25, 1914.
1,164,457.
Patented Dec. 14, 1915.
2 SHEETS—SHEET 1.
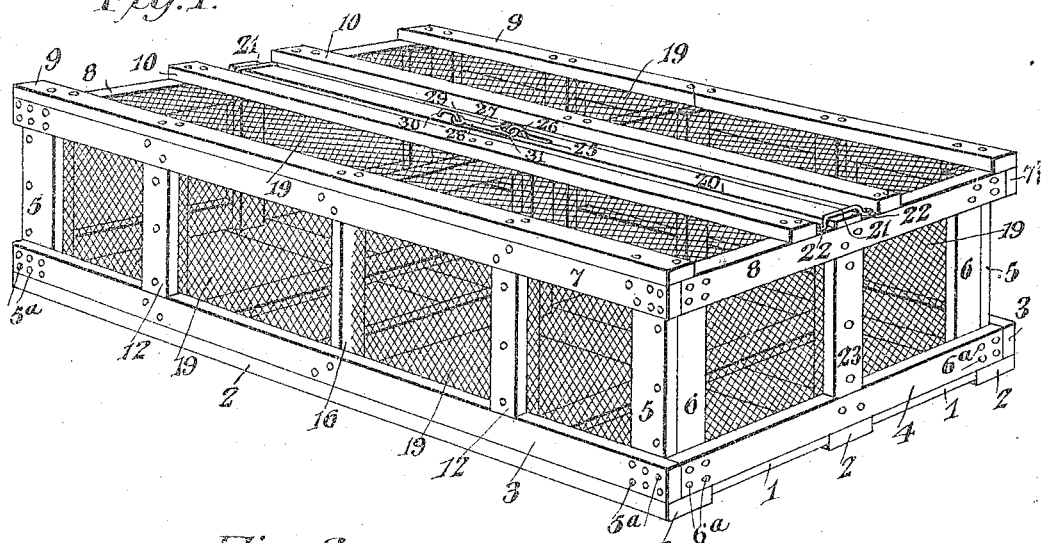
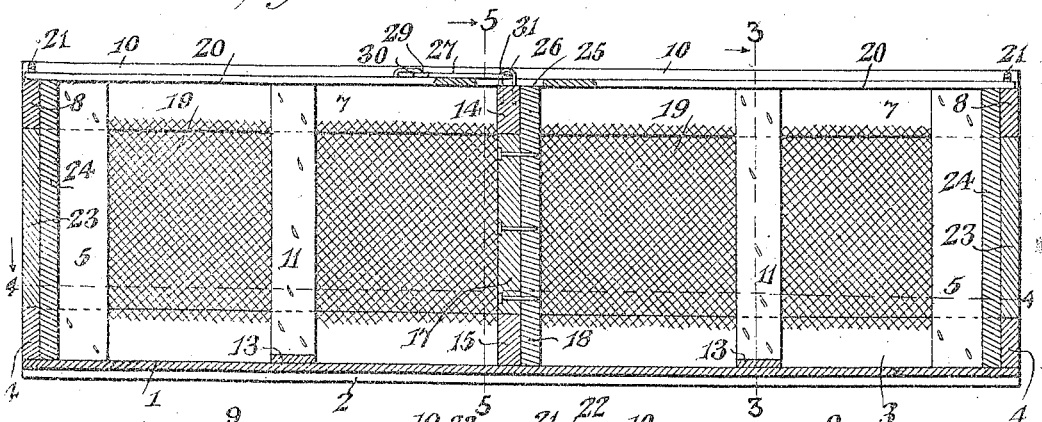
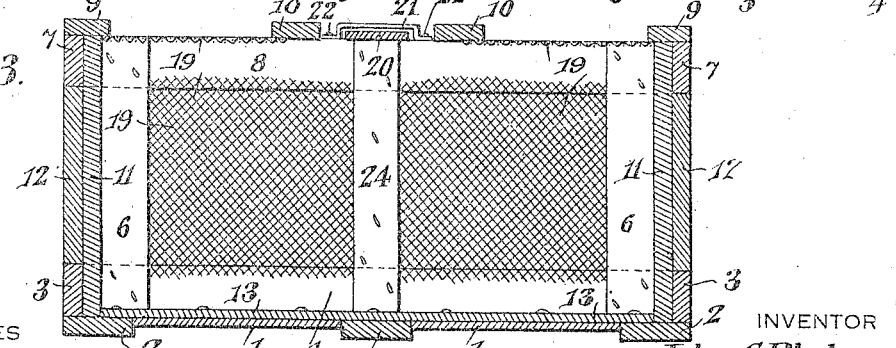
WITNESSES
INVENTOR
John C. Bledsoe,
BY
ATTORNEY

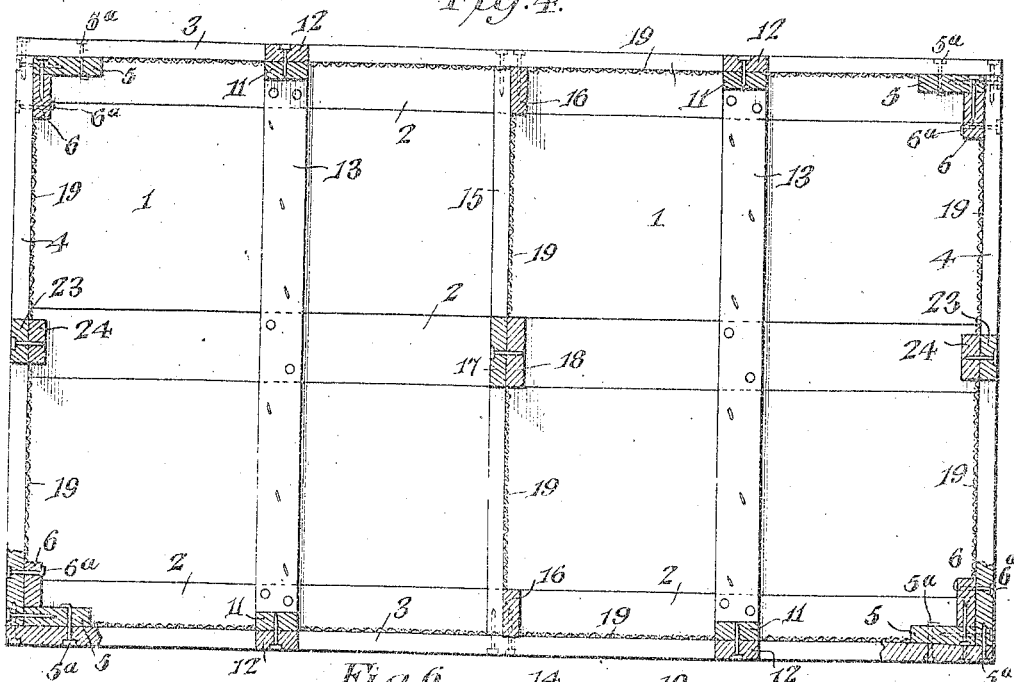
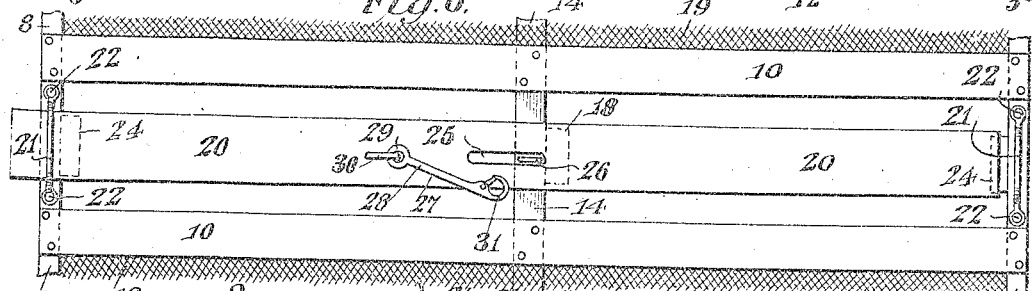
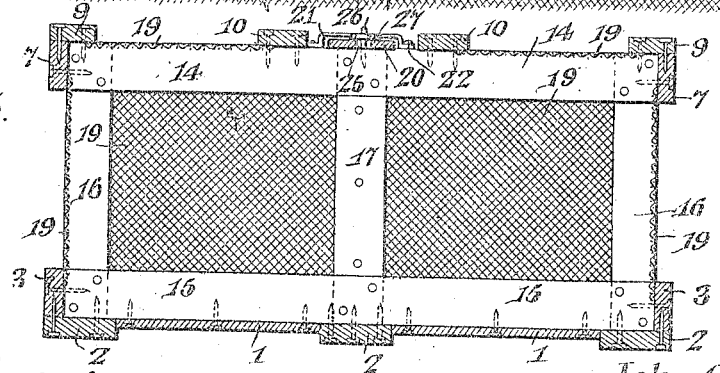

UNITED STATES PATENT OFFICE.

JOHN C. BLEDSOE, OF CLEBURNE, KANSAS.

POULTRY-COOP.

1,164,457.  Specification of Letters Patent.  Patented Dec. 14, 1915.

Application filed November 25, 1914. Serial No. 873,957.

*To all whom it may concern:*

Be it known that I, JOHN C. BLEDSOE, a citizen of the United States, residing at Cleburne, in the county of Riley and State of Kansas, have invented a new and useful Poultry-Coop, of which the following is a specification.

The invention relates to improvements in poultry coops.

The object of the present invention is to improve the construction of poultry coops and to provide a simple, practical, and comparatively inexpensive poultry coop of strong and durable construction, equipped with reinforced corners to prevent the coop from tearing apart at such points, and provided also with a strong floor which will be protected from the wear incident to dragging the coop over rough surfaces.

A further object of the invention is to provide a rigid coop of this character having a plurality of separate compartments and equipped with a closure capable of affording ready access to the contents of the coop and adapted to be securely fastened in its closed position.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawings: Figure 1 is a perspective view of a poultry coop constructed in accordance with this invention. Fig. 2 is a longitudinal sectional view of the same. Fig. 3 is a transverse sectional view on the line 3—3 of Fig. 2. Fig. 4 is a horizontal sectional view on the line 4—4 of Fig. 2. Fig. 5 is a transverse sectional view on the line 5—5 of Fig. 2. Fig. 6 is a plan view of a portion of the coop, the slidable locking slat being arranged in position for removal.

Like numerals of reference designate corresponding parts in all the figures of the drawings.

In the accompanying drawings, in which is illustrated the preferred embodiment of the invention, the poultry coop is provided with a bottom consisting of a plurality of spaced thin boards or sections 1 and relatively thick bottom bars 2 interposed between and located at the outer side edges of the thin boards or sections 1, and adapted to support the thin boards or sections of the bottom above the floor or other supporting surface to prevent wear and other injury to the thin boards or sections when the coop is dragged over rough surfaces. The coop may be made of any desired dimensions, and the thin boards or sections 1 and the bars 2 of the bottom preferably extend longitudinally of the coop. The thin boards or sections 1 and the relatively thick bars 2 have their upper faces arranged in flush relation to provide a smooth floor or bottom to the coop, and the latter is provided at the upper face of the bottom with side and end marginal strips 3 and 4 arranged edgewise upon the bottom and nailed or otherwise secured to the same with their adjacent ends contiguous to one another to form a lower upwardly projecting flange at the side and end edges of the bottom.

The coop is equipped with corner posts composed of separate vertical bars 5 and 6 arranged at right angles to each other and fitted in the corners formed by the side and end marginal strips and secured to the latter and to upper side and end horizontal bars 7 and 8, by nails or other suitable fastening devices. The bars 5 and 6 form flanged corner posts which are approximately L-shaped in horizontal section, as clearly illustrated in Fig. 4 of the drawings, and the fastening devices 5ª and 6ª, which secure the lower bars or strips 3 and 4 and the upper bars 7 and 8 to the posts are arranged at right angles to one another. By this construction a coop frame of great strength and durability is provided, and the corners are reinforced and the coop effectually prevented from tearing apart at such points. The frame of the coop is provided at the top with side and intermediate longitudinal bars 9 and 10, arranged at the side edges of the coop and at opposite sides of the center thereof, as clearly shown in Fig. 3 of the drawings.

The frame of the coop is equipped at opposite sides with intermediate posts composed of inner and outer vertical bars 11 and 12, secured flat against each other and preferably arranged equidistant to the center and terminals of the sides of the coop, but any number of intermediate posts may, of course, be employed. The inner bars 11, which extend from the bottom of the coop to the top side bars 9, are fitted against the inner faces of the upper and lower side bars or members 3 and 7, and their lower ends are arranged upon the bars 2 of the bottom of the coop. The upper ends of the bars 11 fit against and assist in supporting the top side bars 9, while the outer bars 12 of the intermediate posts are arranged between the lower and upper side bars or members 3 and 7 and have their ends fitted against the adjacent edges thereof. The intermediate posts are braced by transverse bottom cleats 13, secured to the upper face of the bottom of the coop and extending across the same and having its ends fitted against the inner faces of the inner vertical bars 11 of the intermediate posts at the lower ends of the said bars 11. By this construction the intermediate posts are braced and their lower ends held against inward movement.

The coop is divided into two separate compartments by a transverse partition comprising top and bottom horizontal bars 14 and 15, vertical side bars 16, and a central post composed of vertical bars 17 and 18, fitted flat against each other. The bar 17 is arranged between the upper and lower horizontal bars 14 and 15, and the bar 18, which extends from the bottom of the coop to the upper edge of the bar 14, is fitted flat against the latter and also the lower bar 15. The side and end walls, the central partition, and the top of the coop are preferably equipped with wire netting 19 for covering the spaces between the slats or bars, but instead of providing wire netting, any other suitable means may be employed for completing the side and end walls, the top, and the partition of the coop. The intermediate top longitudinal slats 10 of the coop are spaced apart a sufficient distance to provide entrance openings which afford access to the compartments of the coop, and the latter is provided at the top with a slidable slat 20 extending from one upper end bar 8 to the other and having its terminals arranged in transverse keepers 21 when the slidable slat is in its closed position. The keepers consist of metallic straps or pieces secured at their terminals 22 and the upper edges of the upper end bars 8, and angularly bent between their ends to form a U-shaped portion. The terminals 22 of the keepers are preferably provided with eyes to receive the fastening devices for securing the keepers to the frame of the coop. The frame of the coop is braced and reinforced between the ends of the slidable bar by intermediate end posts composed of inner and outer vertical bars 23 and 24 secured together and arranged similar to the intermediate posts at opposite sides of the coop. The outer vertical bar 3 extends from the lower end bar or strip 4 to the upper end bar 8 and the inner vertical bar 24, which is secured flat against the inner faces of the bars 4 and 8 and extends upwardly from the bottom of the coop to the upper edge of the bar 8, and is adapted to form a support for the slidable slat. The slidable slat is provided at its center with a narrow longitudinal slot 25, receiving a staple 26 which is embedded in and projects upwardly from the upper edge of the top bar 14 of the central transverse partition. The staple 26 forms a stop for the slat, and the slot 25 is of sufficient length to permit either end of the slidable slat 20 to be moved beyond the coacting keeper 21, and when one end of the slat is carried inwardly beyond the keeper, it is supported by the inner bar of the adjacent intermediate end post. By this construction the slidable slat may be readily lifted from the coop to afford access to either or both of the compartments. The slat is locked in a central closed position by means of a fastening device 27 consisting of a shank or bar 28 provided at its outer end with an eye 29 which is linked into a suitable eye or loop 30 of the slidable slat 20. The other end of the shank or bar 28 is provided with a snap hook 31 for engaging the staple 26, but any other suitable fastening means may, of course, be employed for securing the slat in its closed position. The fastening device affords ready access to the interior of the coop and the contents may be readily placed therein and removed without driving or withdrawing nails or splitting or otherwise injuring the slats or bars of the coop.

What is claimed is:—

1. A coop of the class described comprising a bottom, upper and lower side bars, the lower side bars being secured to the bottom, opposite intermediate posts composed of inner and outer vertical bars fitted flat against each other, the outer vertical bars extending from the lower side bars to the upper side bars and arranged between and bearing at their ends against the same, and the inner vertical bars having their upper and lower ends secured flat against the inner faces of the upper and lower side bars and resting upon the said bottom.

2. A coop of the class described including a bottom, upper and lower side bars, the lower side bars being arranged upon the said bottom, opposite intermediate posts composed of inner and outer vertical bars fitted flat against each other, the outer vertical bars extending from the lower side bars to the upper side bars and arranged between the same, and the inner vertical bars being secured flat against the said upper and lower vertical bars and mounted upon the said bottom, and a transverse cleat secured to the upper face of the said bottom and extending across the space between the inner vertical bars and bracing the latter.

3. A coop of the class described provided at the top with an entrance opening and having a transverse partition, a slidable slat forming a closure for the entrance opening, keepers carried by the coop and receiving the ends of the said slat, which is slidable in either direction to carry either end beyond the adjacent keeper, said slat being provided with a slot located at the partition, a staple mounted on the partition and extending through the slot and forming a stop for limiting the sliding movement of the slat, and a fastening device mounted on the slat and provided with means for engaging the staple to secure the slat against movement in either direction.

In testimony, that I claim the foregoing as my own, I have hereto affixed my signature in the presence of two witnesses.

JOHN C. BLEDSOE.

Witnesses:
 GEO. NOWAK,
 A. J. SAMUELSON.